United States Patent
Freeman

(10) Patent No.: US 10,264,385 B2
(45) Date of Patent: *Apr. 16, 2019

(54) SYSTEM AND METHOD FOR DYNAMIC CONTROL OF AUDIO PLAYBACK BASED ON THE POSITION OF A LISTENER

(71) Applicant: Apple Inc., Cupertino, CA (US)

(72) Inventor: Daniel B. Freeman, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/166,080

(22) Filed: May 26, 2016

(65) Prior Publication Data

US 2016/0353223 A1 Dec. 1, 2016

Related U.S. Application Data

(63) Continuation of application No. 13/846,716, filed on Mar. 18, 2013, now Pat. No. 9,357,308, which is a continuation of application No. 11/635,452, filed on Dec. 5, 2006, now Pat. No. 8,401,210.

(51) Int. Cl.
*H04S 7/00* (2006.01)
*H04R 5/04* (2006.01)
*G06F 3/16* (2006.01)

(52) U.S. Cl.
CPC ............ *H04S 7/303* (2013.01); *G06F 3/167* (2013.01); *H04R 5/04* (2013.01); *H04S 2400/01* (2013.01)

(58) Field of Classification Search
None
See application file for complete search history.

(56) References Cited

U.S. PATENT DOCUMENTS

| | | | | |
|---|---|---|---|---|
| 5,255,326 | A | * 10/1993 | Stevenson | H03G 1/02 381/110 |
| 6,741,273 | B1 | 5/2004 | Waters et al. | |
| 6,757,397 | B1 | 6/2004 | Buecher et al. | |
| 6,909,921 | B1 | * 6/2005 | Bilger | G05B 15/02 700/14 |
| 7,110,558 | B1 | * 9/2006 | Elliott | H03G 3/32 381/104 |
| 7,190,798 | B2 | 3/2007 | Yasuhara | |
| 2002/0027995 | A1 | * 3/2002 | Kanai | H04S 3/02 381/63 |

(Continued)

*Primary Examiner* — Curtis A Kuntz
*Assistant Examiner* — Qin Zhu
(74) *Attorney, Agent, or Firm* — Womble Bond Dickinson (US) LLP

(57) ABSTRACT

An optimal listening position for the multi-channel audio sound system is determined. A listening area and other audio playback controls may also be defined or modified by a listener. During subsequent audio playback, an imager captures images of at least a portion of the listener. When the listener has moved to a position that is different from a previous position, one or more audio parameters are adjusted for at least one channel in the multi-channel audio system in order to reposition the initial or previous optimal listening position to the current position of the listener. When the listener moves outside the listening area, an out of bounds response is initiated to disable or control the audio playback until the listener moves to a position within the listening area.

20 Claims, 4 Drawing Sheets

(56) References Cited

U.S. PATENT DOCUMENTS

| | | | |
|---|---|---|---|
| 2002/0136414 A1* | 9/2002 | Jordan | H04S 3/00 381/58 |
| 2002/0151996 A1* | 10/2002 | Wilcock | G06F 3/167 700/94 |
| 2003/0031334 A1* | 2/2003 | Layton | H04R 27/00 381/310 |
| 2004/0076301 A1* | 4/2004 | Algazi | H04S 7/304 381/17 |
| 2004/0156512 A1* | 8/2004 | Parker | H04R 5/033 381/74 |
| 2005/0094822 A1* | 5/2005 | Swartz | A61B 5/121 381/56 |
| 2005/0152565 A1 | 7/2005 | Jouppi et al. | |
| 2005/0196131 A1* | 9/2005 | Narusawa | G10H 1/46 386/241 |
| 2006/0045294 A1 | 3/2006 | Smyth | |
| 2006/0062410 A1* | 3/2006 | Kim | H04S 7/302 381/310 |
| 2006/0072764 A1* | 4/2006 | Mertens | H04S 1/00 381/56 |
| 2006/0140420 A1* | 6/2006 | Machida | H04H 60/04 381/116 |
| 2006/0239471 A1 | 10/2006 | Mao et al. | |
| 2007/0009120 A1* | 1/2007 | Algazi | H04R 5/027 381/310 |
| 2007/0011196 A1 | 1/2007 | Ball et al. | |
| 2007/0019815 A1 | 1/2007 | Asada et al. | |
| 2007/0116306 A1 | 5/2007 | Riedel et al. | |
| 2008/0008329 A1* | 1/2008 | Pdersen | H04S 7/302 381/58 |
| 2008/0240474 A1* | 10/2008 | Sakamoto | H04R 5/02 381/300 |

\* cited by examiner

SYSTEM AND METHOD FOR DYNAMIC CONTROL OF AUDIO PLAYBACK BASED ON THE POSITION OF A LISTENER

RELATED APPLICATION

This application is a continuation of U.S. patent application Ser. No. 13/846,716 filed on Mar. 18, 2013, which is a continuation of U.S. patent application Ser. No. 11/635,452, filed on Dec. 5, 2006, now issued as U.S. Pat. No. 8,401,210, entitled "System and Method for Dynamic Control of Audio Playback Based on the Position of a Listener."

BACKGROUND

Computer systems and other electronic devices are used for a variety of purposes. For example, a user can access the internet, create or edit videos of images, watch movies with a digital video disk (DVD) drive, and listen to music using the DVD or compact disc (CD) drives. Some of the applications use a multi-channel audio system to generate audio playback, such as with stereo or surround sound.

Typically a user or listener must tune or calibrate the multi-channel audio system to determine an optimal listening position where the best sound presentation can be heard. Calibration of the audio system is based on the locations of the speakers and the equalizer and balance control settings. Once determined, the optimal listening position does not change unless the listener re-calibrates the audio system for a different optimal listening position.

When computer systems and other audio systems, listeners can perform multiple tasks during audio playback that result in the listener moving away from the optimal listening position. The quality of the audio playback is then reduced and the listening experience diminished for the listener when the listener is located in a position different from the optimal listening position. Thus, a fixed optimal listening position limits the enjoyment a listener can receive from a multi-channel audio system.

SUMMARY

In accordance with the invention, a system and method for dynamic control of audio playback based on the position of a listener are provided. Initially an optimal listening position for the multi-channel audio sound system is determined. A listening area and other audio playback controls may also be defined or modified by a listener. During subsequent audio playback, an imager captures images of at least a portion of the listener. When the listener has moved to a position that is different from a previous position, one or more audio parameters are adjusted for at least one channel in the multi-channel audio system in order to reposition the initial or previous optimal listening position to the current position of the listener. When the listener moves outside the listening area, an out of bounds response is initiated to disable or control the audio playback until the listener moves to a position within the listening area.

DETAILED DESCRIPTION

Figure 1:
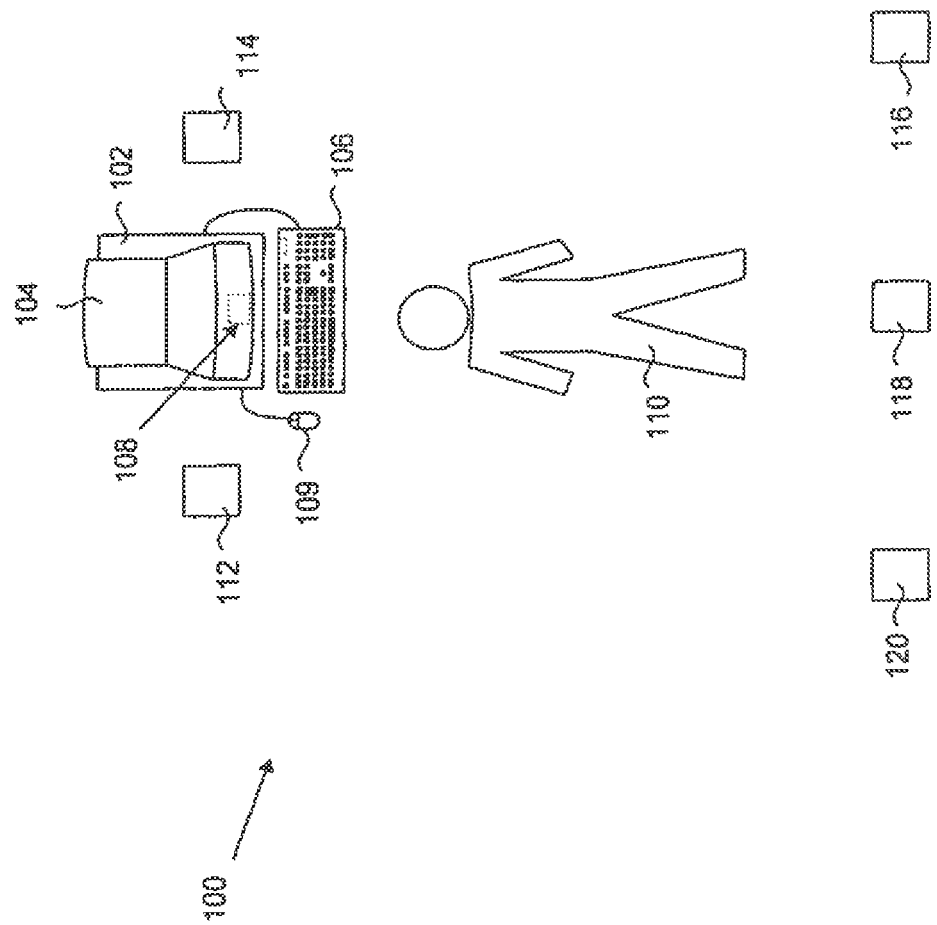
FIG. 1 is a graphic illustration of a computer system in an embodiment in accordance with the invention.

The following description is presented to enable embodiments of the invention to be made and used, and is provided in the context of a patent application and its requirements. Various modifications to the disclosed embodiments will be readily apparent, and the generic principles herein may be applied to other embodiments. Thus, the invention is not intended to be limited to the embodiments shown but is to be accorded the widest scope consistent with the appended claims. Like reference numerals designate corresponding parts throughout the figures.

FIG. 1 is a graphic illustration of a computer system in an embodiment in accordance with the invention. Computer system 100 includes computer 102, monitor 104, keyboard 106, imager 108, and input device 109, shown here as a mouse. Imager 108 is built into the enclosure of monitor 104 and is therefore shown in phantom in FIG. 1. Imager 108 is implemented, for example, as a camera or web cam in an embodiment in accordance with the invention.

In another embodiment in accordance with the invention, imager 108 is a separate discrete device positioned on top of monitor 104. When imager 108 is a separate, discrete device, imager 108 may be connected to computer 102 using any known type of connection, such as a Firewire or Universal Serial Bus (USB) connection. And in yet another embodiment in accordance with the invention, imager 108 is a separate, discrete device that is positioned independent of computer system 100 and able to capture images of the head or body of listener 110. By way of example only, imager 108 may be affixed to a wall located on a side, in front of, or behind computer system 100. The images captured by imager 108 are then transmitted to computer 102 via a wired or wireless connection.

Listener 110 may be seated in front of or near monitor 104, standing in front of or near monitor 104, moving around computer system 100, or moving around a given area such as, for example, a room. Speakers 112, 114, 116, 118, 120 are connected to computer 102 using a wired or wireless connection. The connections between speakers 112, 114, 116, 118, 120 and computer 102 are omitted from FIG. 1 for clarity. Computer 102 provides listener 110 with multi-channel audio playback using speakers 112, 114, 116, 118, 120 in an embodiment in accordance with the invention. Embodiments in accordance with the invention, however, are not limited to the number and configuration of speakers 112, 114, 116, 118, 120. Two or more speakers can be used to provide multi-channel audio playback in other embodiments in accordance with the invention.

Additionally, embodiments in accordance with the invention are not limited to use in a computer system. Other types of audio systems can be use to implement embodiments in accordance with the invention. For example, other types of audio systems include, but are not limited to, television or home theater systems and audio CD and DVD systems.

Figure 2:
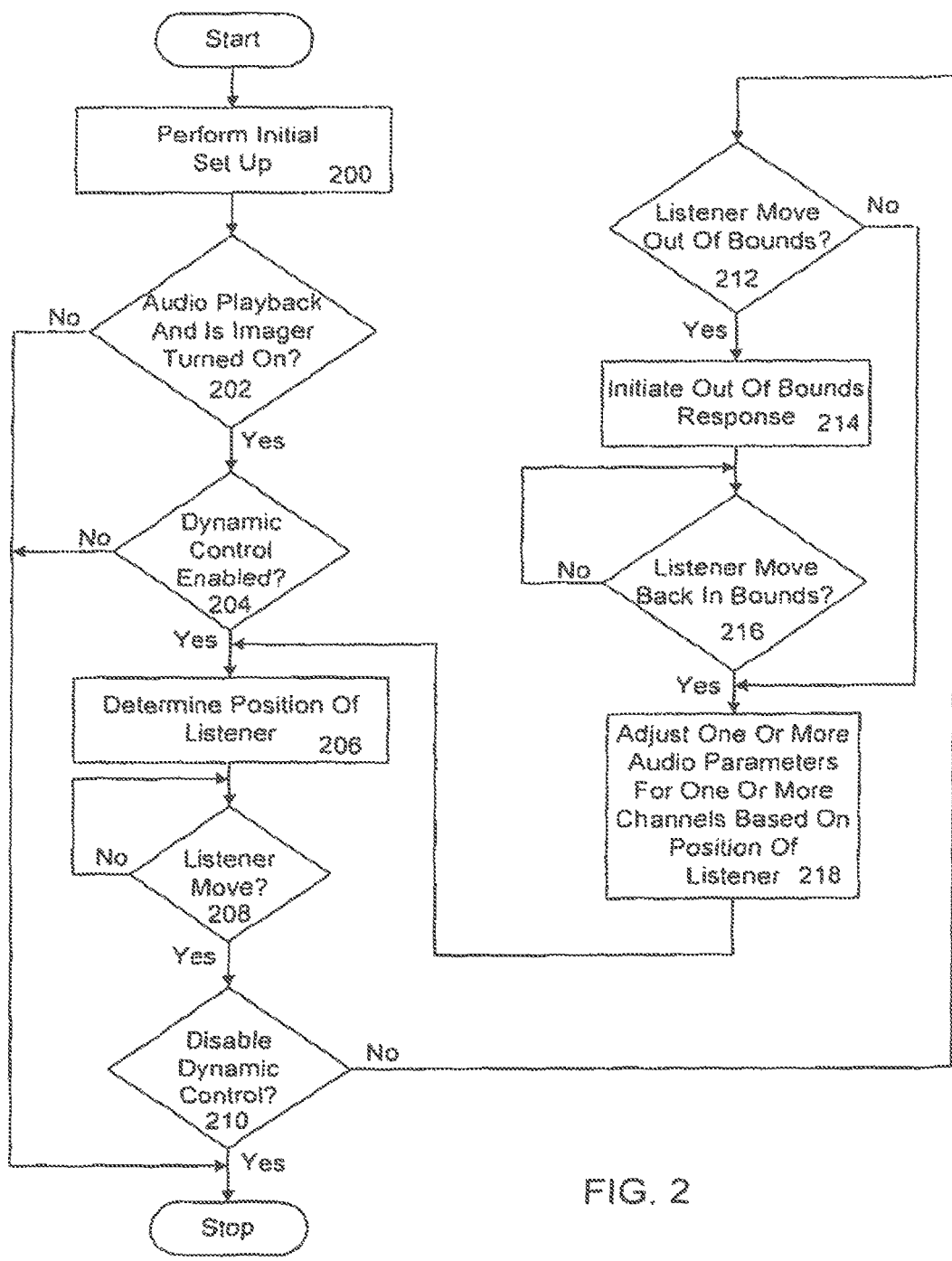
FIG. 2 is a flowchart of a method for dynamic control of audio playback based on the position of a listener in an embodiment in accordance with the invention.

Referring now to FIG. 2, there is shown a flowchart of a method for dynamic control of audio playback based on the position of a listener in an embodiment in accordance with the invention. Initially a person or system performs an initial set up, as shown in block 200. An exemplary initial set up is discussed in more detail in conjunction with FIG. 3.

A determination is then made at block 202 as to whether the imaging module is turned on and the listener will be using an application or feature that plays audio. If so, a determination is made as to whether the listener has enabled dynamic control of the audio playback (block 204). When the listener has enabled dynamic control of the audio playback, the position of the listener is tracked at block 206.

The position of the listener can be tracked using any one of a variety of techniques. The position of the listener is tracked in real-time by tracking the head or face of the listener using facial recognition software in an embodiment in accordance with the invention. In another embodiment in accordance with the invention, the position of the listener is tracked by detecting the location of one or both eyes of the listener. For example, one or both eyes of the listener may be tracked with the eye detection system disclosed in United States Patent Application Publication 2005/0133693A1.

A determination is then made at block 208 as to whether the listener or a portion of interest of the listener has moved. By way of example only, a portion of interest is the face or eyes of a listener. If the listener has not moved, the method waits until the listener moves. When the listener or a portion of interest of the listener has moved, a determination is made at block 210 as to whether the listener has disabled the dynamic control of the audio playback.

Dynamic control of the audio playback is disabled when any one of a number of possible actions are taken by the listener in an embodiment in accordance with the invention. For example, dynamic control of the audio playback is disabled when the listener stops audio playback in one embodiment in accordance with the invention. In another embodiment in accordance with the invention, dynamic control of the audio playback is disabled when the listener disables a software program that implements dynamic control of audio playback.

The method passes to block 212 when the listener has not disabled dynamic control of the audio playback. At block 212 a determination is made as to whether the listener or the head of the listener has moved out of the listening area or "out of bounds." The listening area is defined by the listener during the initial set up in an embodiment in accordance with the invention. The listening area can assume any given dimensions, such as for example, the area in front of the imaging module, a portion of a room, or en entire room. In another embodiment in accordance with the invention, the listening area is programmed by the manufacturer of the computer or the audio system. The manufacturer may then allow a user to modify one or more dimensions of the listening area.

If the listener has moved out of bounds, the system initiates the out of bounds response at block 214. The out of bounds response is selected by the listener during the initial set up in an embodiment in accordance with the invention. In other embodiments in accordance with the invention, the out of bounds response is established by the manufacturer of the computer or the audio system. The manufacturer may then allow a user to change the default out of bounds response.

A determination is then made at block 216 as to whether the listener has moved back in bounds or into the listening area. If not, the method waits until the listener moves back in bounds in an embodiment in accordance with the invention. The method passes to block 218 when the listener moves back in bounds. One or more audio parameters for one or more channels are then adjusted based on the current position of the listener. For example, in a surround sound audio system, one or more parameters for at least one of the five channels are adjusted.

Tracking of the head, eyes, or face of the listener at block 206 includes determining the location and the orientation of the head, eyes, or face in an embodiment in accordance with the invention. This allows the dynamic adjustments of the audio parameters to adjust for both the current location and the current orientation of the listener. Audio parameters that may be adjusted include, but are not limited to, volume, left/right head orientation, and up/down head orientation, equalizer, and balance. The adjustments to the one or more audio parameters for at least one channel reposition the initial or previous optimal listening position to the current position of the listener.

Returning again to block 212, the method passes to block 218 when the listener has moved but remained in bounds. One or more audio parameters are then adjusted based on the position of the listener. The method then returns to block 206 and repeats until the listener disables the dynamic control of the audio playback.

Figure 3:
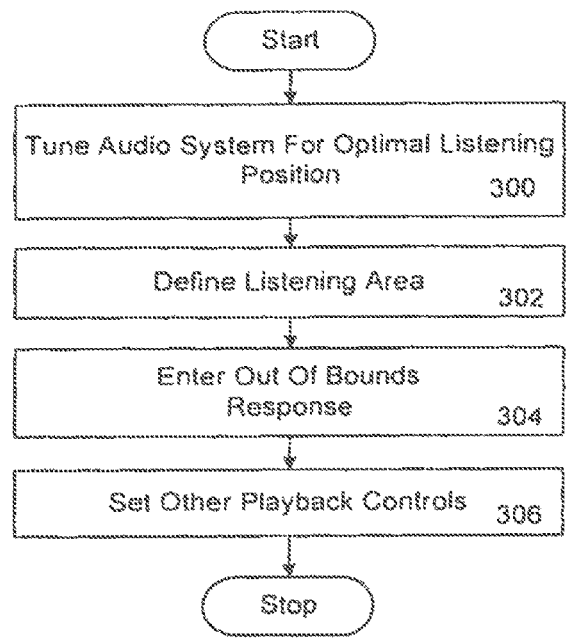
FIG. 3 is a flowchart of a method that can be used to perform block 200 shown in FIG. 2 in an embodiment in accordance with the invention.

FIG. 3 is a flowchart of a method that can be used to perform block 200 shown in FIG. 2 in an embodiment in accordance with the invention. Initially the audio system is tuned or calibrated for the optimal listening position, as shown in block 300. For example, the audio system is calibrated to determine an initial "sweet spot" or location where the best soundstage presentation can be heard. The sweet spot is a position equidistant from the speakers in one embodiment in accordance with the invention. The sweet spot typically can be shaped to the size and layout of a room when the audio system includes multiple speakers, such as the multiple speakers used in a surround sound system.

The listening area is then defined at block 302. Next, at block 304, the listener specifies the out of bound response. The defined listening area and the specified out of bounds response are used in blocks 212 and 214 of FIG. 2, respectively.

Finally, other playback controls are specified at block 306. By way of example only, one other playback control set at block 306 is volume controls. The volume controls, if specified, can be used in block 218 of FIG. 2. For example, a listener may want to limit the volume adjustments within the listening area. The listener may want to specify a maximum loudness and a minimum softness the volume can reach within the listening area.

Figure 4:
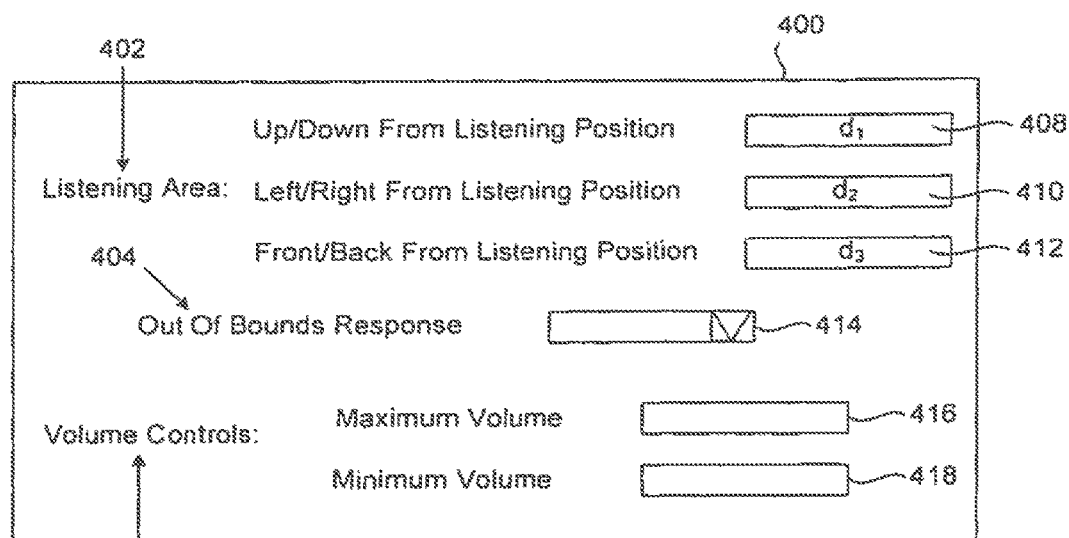
FIG. 4 is a graphic illustration of a user interface that can be used to perform blocks 302, 304, and 306 shown in FIG. 3 in an embodiment in accordance with the invention.

The listening area, the out of bounds response, and the other playback controls can be set using any one of a number of techniques. FIG. 4 is a graphic illustration of a user interface that can be used to perform blocks 302, 304, and 306 shown in FIG. 3 in an embodiment in accordance with the invention. User interface 400 includes the three playback controls of listening area 402, out of bounds response 404, and volume controls 406. The listening area is defined with dialog boxes 408, 410, 412. In the embodiment shown in FIG. 4, the listener enters as distance measurement into each dialog box 408, 410, 412. Each distance measurement indicates the distance between the center of the optimal listening position and one edge of the listening area in one embodiment in accordance with the invention. In another embodiment in accordance with the invention, each distance measurement is the distance between the imaging module and one edge of the listening area.

For example, when the listening area is viewed as a three-dimensional Cartesian coordinate system, the distance measurement ($d_1$) entered into dialog box 408 represents the distance between the center of the optimal listening position (e.g., 0, 0, 0) and the maximum distance in either the positive or negative direction along the Z-axis (e.g., (0, 0, $d_1$) or (0, 0, $-d_1$)). The distance measurement ($d_2$) entered into dialog box 410 represents the distance between the center of the optimal listening position (e.g., 0, 0, 0) and the maximum distance in either the positive or negative direction along the x-axis (e.g., ($d_2$, 0, 0) or ($-d_2$, 0, 0)). Finally, the distance measurement ($d_3$) entered into dialog box 412 represents the distance between the center of the optimal listening position (e.g., 0, 0, 0) and the maximum distance in either the positive or negative direction along the y-axis (e.g., (0, $d_3$, 0) or (0, 0)).

Pull-down menu 414 allows a listener to select one of several options for the out of bounds response. The out of bounds response includes, but is not limited to, turning off the audio playback, turning off the computer, reducing the sound level to a low level, and leaving the sound level at its current level for a given period of time and then reducing the sound level to a low level or off. Additional or different out of bounds responses can be employed in other embodiments in accordance with the invention.

Maximum volume 416 and minimum volume 418 allow a listener to set the maximum and minimum sound levels for the audio playback. When the listener moves around within the listening area, the sound level is adjusted accordingly so the listener is positioned at an optimal listening position. Thus, as the listener moves away from the original optimal listening position farther from the computer, the sound level increases until, if necessary, the maximum sound level is output. Similarly, as the listener moves away from the original optimal listening position towards the computer, the sound level decreases until, if necessary, the minimum sound level is output.

Embodiments in accordance with the invention are not limited to the user interface and the features shown in FIG. 4. Other embodiments in accordance with the invention can employ different techniques to allow a listener to customize his or her listening experience. By way of example only, sliding controls, graphical representations of as room or listening area with user-controlled speaker placement and listening area boundary placements, and other user-selected playback controls can be included in other embodiments in accordance with the invention.

Figure 5:
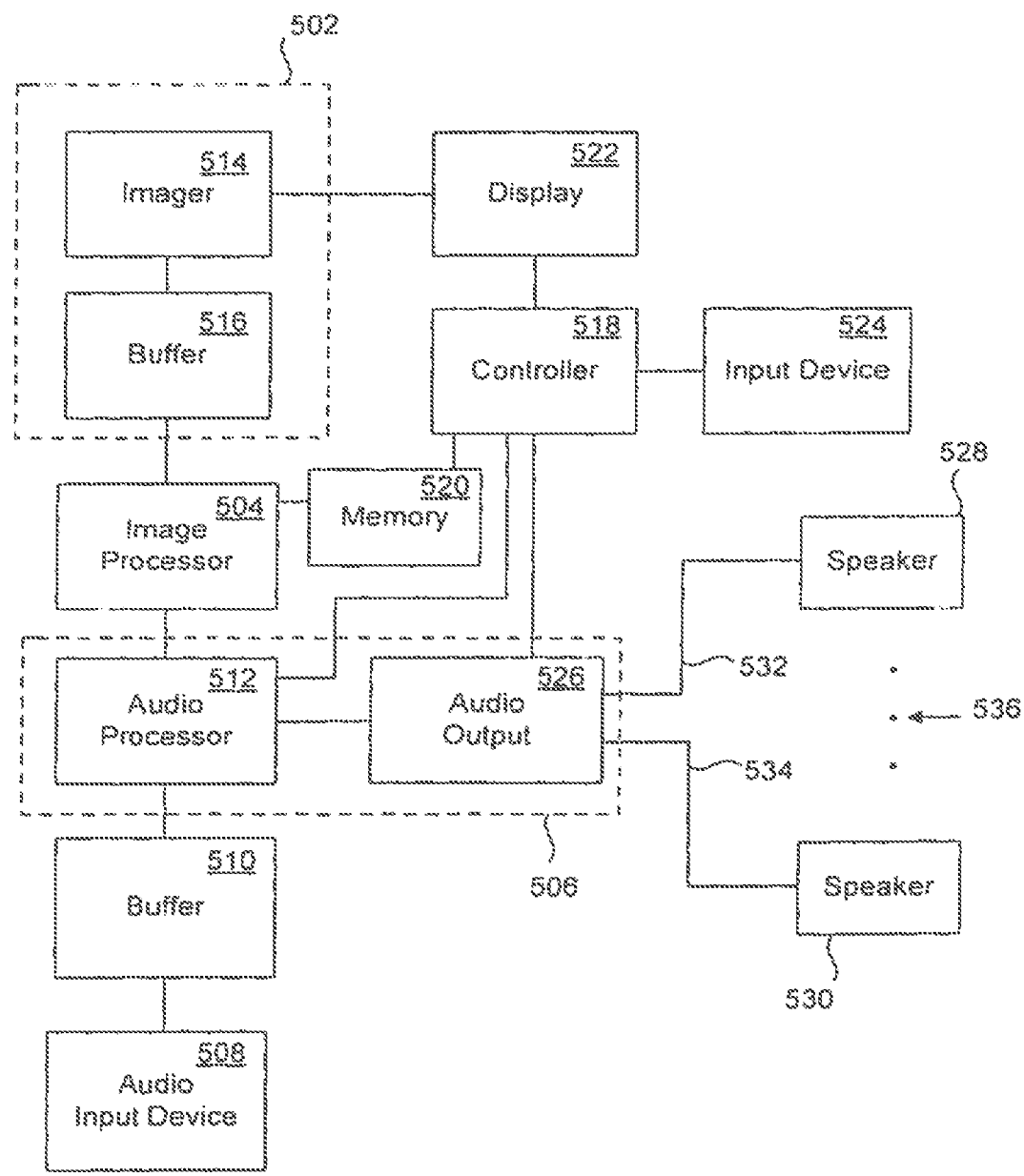
FIG. 5 is a block diagram of a multi-channel audio system that can be used to dynamically control the audio playback based on the position of a listener in an embodiment in accordance with the invention.

Referring now to FIG. 5, there is shown a block diagram of a multi-channel audio system that can be used to dynamically control the audio playback based on the position of a listener in an embodiment in accordance with the invention. System 500 includes an imaging module 502, image processing module 504, and audio processing module 506. Audio input device 508 inputs audio signals into system 500. Audio input device 508 is implemented as a digital video disk (DVD) drive in an embodiment in accordance with the invention. The audio is temporarily buffered in buffer 510 before being received by audio processor 512.

Imager 514 captures images of a listener or of a listening area. The images are temporarily buffered in buffer 516 before being received by image processor 504. Image processor 504 executes a program that determines the position of the listener with respect to the imager in an embodiment in accordance with the invention:

Whether the listener has moved from a previous position is determined in a two step process in an embodiment in accordance with the invention. During the initial set up the optimal listening position with respect to imager 514 is determined and stored in memory 520. The optimal listening position can be determined, for example, by displaying a user interface as shown in FIG. 4 on display 522 and using input device 524 to enter data into the user interface. Input device 524 is implemented as a mouse in an embodiment in accordance with the invention.

During subsequent audio playback, image processor 504 determines the current position of the listener with respect to the imager and stores that determination in memory 520 in an embodiment in accordance with the invention. Controller 518 compares the current position of the listener with the optimal listening position. When the two positions differ, controller 518 generates an adjustment signal that represents the difference between the optimal listening position and the position of the listener.

Audio processor 512 receives the adjustment signal and executes one or more programs that dynamically adjust one or more audio parameters for at least one channel in the multi-channel audio playback. The adjustments to the at least one channel repositions the initial or previous optimal listening position to the current position of the listener. Audio processor 512 then transmits the audio signals to audio output 526. Audio output 526 is implemented as a compression/decompression (codec) component, a sound mixer component, and a sound card in an embodiment in accordance with the invention.

Audio output 526 transmits the audio signals to speakers 528, 530 via connections 532, 334, respectively. Ellipses 536 indicate additional speakers can be included in system 500. For example, with surround sound audio playback, five speakers can be employed in system 500. The five speakers can be configured as a right front speaker, a left front speaker, a rear right speaker, a rear left speaker, and a center speaker typically implemented as a sub woofer.

Image processor 504, audio processor 512, and controller 518 may be implemented as two or more discrete components or as one single component. For example, image processor 504 and controller 518 may be one processor and audio processor 512 as a separate processor. Additionally, buffers 510, 516, and memory 520 may be implemented a two or more discrete components or a one single component.

The invention claimed is:

1. A system with a multi-channel audio sound system that dynamically adjusts audio playback, the system comprising:
    an input device operable to receive an entry of initial set up data, wherein the initial set up data includes a definition of an out of bounds response and a listening area within a room;
    a sensor operable to track an orientation of a portion of interest of a listener and a location of the listener;
    a processing module, operable to
        receive data corresponding to the orientation of the portion of interest of the listener and the location of the listener,
        determine whether the location of the listener is within the listening area, and
        generate, in response to the location of the listener being within the listening area, an adjustment signal based on the orientation of the portion of interest of the listener; and
    an audio module operable to:
        receive the adjustment signal and to produce an audio signal for each channel in the multi-channel audio sound system and to control audio playback of the audio signals by the channels in the multi-channel audio sound system, and initiate, in response to the location of the listener being outside the listening area, the out of bounds response.

2. The system of claim 1, further comprising a plurality of speakers each operable to receive a respective audio signal.

3. The system of claim 1, further comprising an audio input device operable to input a plurality of audio signals into the processing module.

4. The system of claim 1, wherein the sensor comprises a camera connected to the processing module.

5. A system with a multi-channel audio sound system that dynamically adjusts audio playback, the system comprising:
   an input device operable to receive an entry of initial set up data, wherein the initial set up data includes a definition of an out of bounds response and a listening area within a room;
   a sensor operable to track an orientation of a portion of interest of a listener and a location of the listener;
   a sensor processor operable to
      receive data corresponding to the orientation of the portion of interest of the listener and the location of the listener,
      determine whether the location of the listener is within the listening area, and
      store the determination in a memory;
   a controller operable to
      read the determination out of the memory, and
      generate, in response to the location of the listener being within the listening area, an adjustment signal based on the orientation of the portion of interest of the listener; and
   an audio processor operable to:
      receive the adjustment signal and to produce an audio signal for each channel in the multi-channel audio sound system and to control audio playback of the audio signal by the channels in the multi-channel audio sound system, and
      initiate, in response to the location of the listener being outside the listening area, the out of bounds response.

6. The system of claim 5, further comprising a plurality of speakers, each operable to receive a respective audio signal.

7. The system of claim 5, further comprising an audio input device, operable to input a plurality of audio signals into the audio processor.

8. The system of claim 5, wherein the sensor comprises a camera connected to the sensor processor.

9. A method for dynamic control of audio playback in a system having a multi-channel audio sound system, the method comprising:
   receiving initial set up data, wherein the initial set up data includes a definition of an out of bounds response and a listening area within a room;
   capturing data corresponding to an orientation of a portion of interest of a listener and a location of the listener;
   determining whether the listener is within the listening area; and
   when the location of the listener is within the listening area:
      generating an adjustment signal based on the data corresponding to the orientation of the portion of interest of the listener,
      producing an audio signal for each channel in the multi-channel audio sound system, and
      controlling audio playback of the audio signal by the channels in the multi-channel audio sound system based on the adjustment signal, and
   when the location of the listener is outside the listening area, initiating the out of bounds response.

10. The method of claim 9, further comprising performing an initial set up prior to capturing the data corresponding to the orientation of the portion of interest of the listener.

11. The method of claim 10, wherein performing the initial set up prior to capturing the data corresponding to the orientation of the portion of interest of the listener comprises:
   determining an initial listening position;
   determining the listening area;
   setting the out of bounds response that determines a first control response when the listener is outside the listening area; and
   setting one or more playback controls that limit an adjustment for at least one audio parameter.

12. The method of claim 11, further comprising:
   determining whether the listener has moved out of the listening area; and
   when the listener has moved out of the listening area disabling dynamic control of audio playback according to the first control response.

13. The method of claim 12, further comprising
   determining whether the listener has moved to a new position within the listening area subsequent to the listener being outside out of the listening area; and
   when the listener has moved to the new position, adjusting one or more audio parameters for one or more channels in the multi-channel audio sound system according to a second control response, wherein the second control response enables dynamic control of audio playback such that an optimal listening position is repositioned to the new position.

14. The method of claim 9, further comprising determining whether dynamic control of audio playback is enabled.

15. The system of claim 1, wherein the portion of interest of the listener includes one or more of a head, an eye, or a face of the listener.

16. The system of claim 1, wherein the sensor is operable to track movement of the location of the listener, and wherein the processing module is operable to generate the adjustment signal based on the orientation of the portion of interest of the listener and the location of the listener.

17. The system of claim 5, wherein the portion of interest of the listener includes one or more of a head, an eye, or a face of the listener.

18. The system of claim 5, wherein the sensor is operable to track movement of the location of the listener, and wherein the controller is operable to generate the adjustment signal based on the orientation of the portion of interest of the listener and the location of the listener.

19. The method of claim 9, wherein the portion of interest of the listener includes one or more of a head, an eye, or a face of the listener.

20. The method of claim 9, wherein the data further corresponds to the location of the listener, and wherein the adjustment signal is based on the orientation of the portion of interest of the listener and the location of the listener.

* * * * *